United States Patent [19]

Mueller

[11] Patent Number: 4,762,951
[45] Date of Patent: Aug. 9, 1988

[54] NARROWING THE MOLECULAR WEIGHT DISTRIBUTION OF POLY-TETRAHYDROFURAN AND OF COPOLYMERS OF TETRAHYDROFURAN AND ALKYLENE OXIDES

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 21,799

[22] Filed: Mar. 4, 1987

[30] Foreign Application Priority Data

Mar. 11, 1986 [DE] Fed. Rep. of Germany ....... 3607946

[51] Int. Cl.$^4$ ...................... C07C 42/11; C08G 59/68; C08G 65/32
[52] U.S. Cl. ................................... 568/617; 568/621; 528/417; 528/496
[58] Field of Search ................ 568/617, 621; 528/417, 528/496

[56] References Cited

U.S. PATENT DOCUMENTS

| | | | |
|---|---|---|---|
| 3,478,109 | 11/1969 | McConnell | 568/621 |
| 3,925,484 | 12/1975 | Baker | 568/617 |
| 4,251,654 | 2/1981 | Robinson et al. | 528/417 |
| 4,500,705 | 2/1985 | Copelin | 528/417 |
| 4,510,333 | 4/1985 | Pruckmayr | 568/617 |

FOREIGN PATENT DOCUMENTS 800659 6/1968 Canada .

Primary Examiner—Harold D. Anderson
Assistant Examiner—Frederick Krass
Attorney, Agent, or Firm—John H. Shurtleff

[57] ABSTRACT

The molecular weight distribution of polytetrahydrofuran and of copolymers of tetrahydrofuran and alkylene oxides is narrowed by a process in which the polymers are mixed with a solvent mixture consisting of (a) an alkanol, (b) a hydrocarbon and (c) water, the content of the individual components a, b and c in the mixture being from 8 to 60% by weight, after which the three phases formed are separated from one another and the polymer having the narrower molecular weight distribution is isolated from the two lower phases.

10 Claims, 1 Drawing Sheet

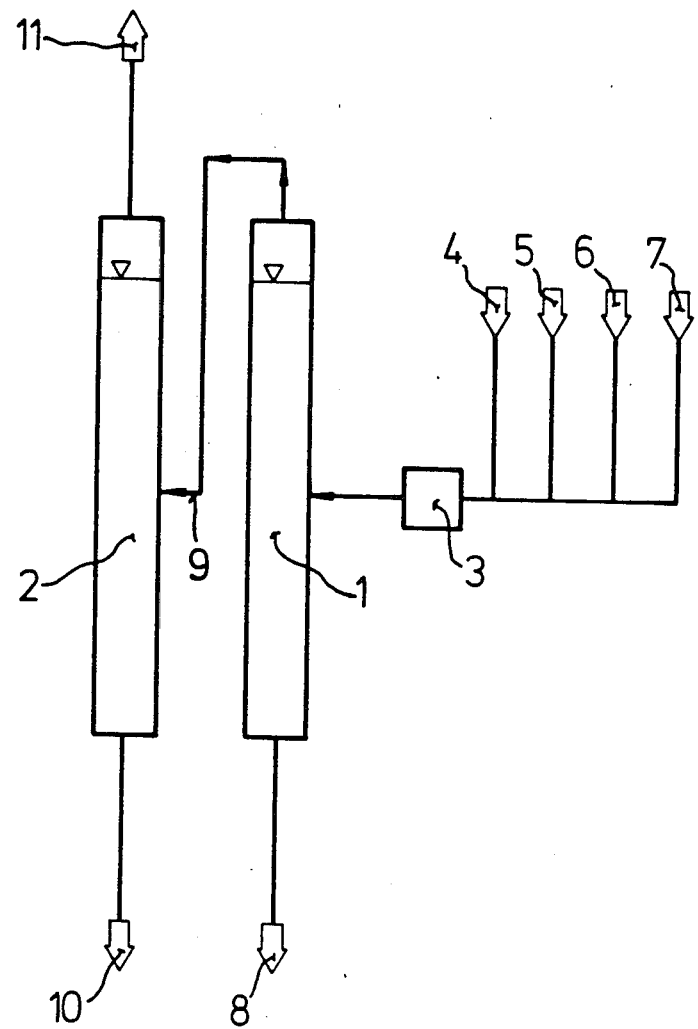

NARROWING THE MOLECULAR WEIGHT DISTRIBUTION OF POLY-TETRAHYDROFURAN AND OF COPOLYMERS OF TETRAHYDROFURAN AND ALKYLENE OXIDES

The present invention relates to a process for narrowing the molecular weight distribution of polytetrahydrofuran and of copolymers of tetrahydrofuran and alkylene oxides by treating the polymer with a solvent mixture consisting of an alcohol, a hydrocarbon and water.

Polytetramethylene-ether-glycol, also referred to as polytetrahydrofuran (PTHF) is an important intermediate. It is frequently used for the preparation of polyurethanes and polyesters, in order to provide these with soft segments. The polymerization of tetrahydrofuran (THF) to PTHF is described in, for example, Angew. Chem. 72 (1960), 927. The relevant prior art includes the monograph "Polytetrahydrofuran" by P. Dreyfuss, Gordon and Breach, Science Publishers, New York, London, Paris 1982.

PTHF is obtained by polymerizing THF with the aid of a cationic catalyst. Like all polymeric compounds, it is composed of molecules having different degrees of polymerization. The width of the molecular weight distribution can vary, depending on the polymerization method chosen. Frequently, a Gaussian distribution is encountered. The molecular weight distribution of PTHF is usually fairly broad and frequently deviates from a Gaussian distribution in that the proportion of fractions of higher molecular weight is smaller than that of fractions of low molecular weight, or vice versa. The uniformity of the molecular weight distribution is defined as the ratio of the weight average molecular weight ($M_w$) to the number average molecular weight ($M_n$). The number average molecular weight is obtained by dividing the weight of a sample by the number of molecules in the sample. The weight average molecular weight, on the other hand, is the sum of the products of fraction weights and molecular weights divided by the sum of the weights of the individual fractions. The molecular weight distribution is thus defined by the quotient $M_w/M_n$, which is also referred to as the heterogeneity factor. This is determined, for example, by determining the molecular weight by the light scattering method or osmometry or from the distribution curves obtained by gel permeation chromatography. The values $M_w$ and $M_n$ can be determined from these measured distribution curves. $M_n$ is also obtained, with great accuracy, by determining the terminal groups of PTHF. The heterogeneity factor is approximately equal to the molecular weight distribution $M_{vis}/M_n$ as described in, for example, German Pat. No. 2,453,114. $M_{vis}$ is referred to as the compression viscosity. It is an empirical value obtained from the relationship log $M_{vis}=0.493$ log viscosity (at 40° C., in poise)$+3.0646$. This relationship is based on the fact that, in the case of polymers having a broad molecular weight distribution, the viscosity increases exponentially with the molecular weight. Thus, it is known that the viscosity of polymers having a broad distribution is higher than those which have the same structure and the same number average molecular weight but a narrow molecular weight distribution. $M_{vis}/M_n$ is in general from 20 to 30% smaller than $M_w/M_n$. The molecular weight distribution of PTHF has a substantial effect on the properties of the polyurethane polymers or polyester polymers prepared from it.

As a quite general rule, the mechanical properties of the finished products, in particular structural materials, which are produced from PTHF are better the more monodisperse the PTHF employed in terms of molecular sizes. Conversely, end products having poorer properties are obtained if the PTHF having a broad molecular weight distribution is used.

Since polymers having a relatively broad molecular weight distribution are obtained in the preparation of PTHF, there is a need to provide either a polymerization process which gives polymers having a narrow molecular weight distribution or a possible method for narrowing the molecular weight distribution of PTHF by means of an aftertreatment.

Canadian Pat. No. 800,659 states that a PTHF having a narrower molecular weight distribution is obtained if the polymerization of THF is terminated before equilibrium is reached. A process of this type is difficult to reproduce because products having different mean molecular weights are formed depending on the time when the polymerization is terminated. Furthermore, this measure narrows the molecular weight distribution only to a small extent, and the resulting conversion of the monomer is lower than that in the equilibrium reaction, making the process more expensive.

German Pat. No. 2,453,114 describes a process for the preparation of a PTHF having a narrow molecular weight distribution, in which a PTHF starting material is partially depolymerized to tetrahydrofuran at from 120° to 150° C. in the presence of a crosslinked ion exchanger resin in the acid form. Although this process gives satisfactory results, it has the disadvantage that crosslinked ion exchanger resins are expensive and have only limited stability to the substrate at elevated temperatures. The process can therefore only be carried out in a very narrow temperature range from 120° to 135° C. There is always the risk that the PTHF used will be contaminated with dissolved ion exchanger resin components, or the polymer will be discolored. Even at the low temperatures of 120°–135° C., pronounced swelling of the ion exchanger resins and contamination of the PTHF with small amounts of these resins cannot be completely avoided. The temperature limit restricts the rate of depolymerization and makes the process more expensive. In particular, only small molecules are degraded by the process. The heavier molecules remain intact since they reach the acidic centers of the catalyst only slowly, if at all. Hence, this process can only be used to narrow the molecular weight distribution in the case of polymers having mean molecular weights of from 600 to 2000.

Recently, U.S. Pat. No. 4,510,333 disclosed a process for the preparation of PTHF having a narrow molecular weight distribution, in which, in a first stage, a mixture of THF and an ionic initiator are heated in order to produce a maximum number of oxonium ions, and then, in a second state, at a lower temperature, the actual polymerization is carried out with the addition of further THF. Such a process involves complicated apparatus and is energy-consumptive, and is consequently very expensive. The continuous polymerization by this two-state procedure also presents difficulties in terms of process engineering. In the method described in Japanese Preliminary Published Application No. 85/42421, PTHF having a broad molecular weight distribution is treated with a mixture of water and a solvent which has a poor dissolving power for PTHF, and the treatment mixture is separated into two fractions having a narrower molecular weight distribution. This process if unsuccessful in the case of a PTHF having a molecular weight greater than 1500 and also in the case of copolymers of THF and alkylene oxides. Moreover, the fraction having the higher molecular weight becomes enriched with the oligomeric cyclic ethers present in the polymer.

It is an object of the present invention to provide a process which makes it possible to convert a PTHF having a broad molecular weight distribution into a PTHF having a narrow molecular weight distribution in a short treatment time. Moreover, contamination of the product by catalyst components is unacceptable, and there should be no restriction with regard to the size of the molecules of the polymer to be treated. Trouble-free polymerization of the tetrahydrofuran, in which it is not necessary to maintain temperature stages, is also desirable. The process should also make it possible to convert given polymers not only to polymers having mean molecular weights which are higher than those of the starting materials but also to polymers whose mean molecular weights are lower than those of the starting polymers. Finally, the novel process should also be applicable to polymers of THF which have molecular weights greater than 1500 and to copolymers of THF and alkylene oxide, and it should also be possible to separate off the oligomeric cyclic ethers which are always present in the polymers.

We have found that this object is achieved by a novel process for narrowing the molecular weight distribution of polytetrahydrofuran and of copolymers of tetrahydrofuran and alkylene oxides, wherein the polymers are mixed with a solvent mixture consisting of (a) an alkanol of 1 to 4 carbon atoms, (b) a hydrocarbon of 4 to 12 carbon atoms and (c) water, the content of the individual components a, b and c in the mixture being from 8 to 60% by weight, the phases which form are separated from one another, and the polymer having the narrower molecular weight distribution is then isolated from the two lower phases. Cyclic oligomeric ethers present in the polymer accumulate in the light hydrocarbon phase.

In the process of the invention, the starting material used is a PTHF which is obtainable by a conventional method, by polymerizing THF with the aid of a cationic catalyst. This PTHF generally has a number average molecular weight of from 500 to 3000, a heterogeneity factor of from 1.5 to 4 and a viscosity of from 1 to 70 poise (at 40° C.). In the case of these starting materials, the molecular weight distribution is in general narrowed, according to the invention, in such a way that, for the above molecular weight range, a PTHF having a molecular weight distribution ($M_w/M_n$) of from 1.2 to 2.5 is obtained. The lower value is assigned to the products of low molecular weight, and the higher value to the products of high molecular weight up to 3000.

The novel process can also be used to treat copolymers obtainable by copolymerization of THF with alkylene oxides, the said copolymers being split up as a result to give polymers having a narrow molecular weight distribution. Particularly preferred copolymers are those of the stated type whose content of oligomeric cyclic ethers is less than 7% by weight. Such copolymers are obtained, for example, by processes as stated in U.S. Pat. No. 4,500,705. They contain, for example, from 60 to 80% by weight of THF and from 20 to 40% by weight of ethylene oxide or, for example, propylene oxide.

In the process of the invention, the molecular weight distribution of PTHF and of the stated copolymers is narrowed by treatment with a solvent mixture consisting of (a) an alkanol of 1 to 4 carbon atoms, (b) a hydrocarbon of 4 to 12 carbon atoms and (c) water. The content of components a, b and c in the solvent mixture is from 8 to 60, preferably from 12 to 50, in particular from 15 to 40, % by weight. The solvent mixtures of the stated type are two-phase mixtures.

Methanol or ethanol is advantageously used as the alkanol of 1 to 4 carbon atoms. Suitable hydrocarbons of 4 to 12, preferably 5 to 8, carbon atoms, are aromatic or saturated or unsaturated aliphatic or cycloaliphatic hydrocarbons. Cycloaliphatic hydrocarbons or mixtures of these with aromatic or aliphatic hydrocarbons are preferred. The readily available hydrocarbons, such as n-heptane, n-octane, cyclopentane, cyclohexane, methyl cyclohexane or cyclooctane, are advantageously used, cyclohexane and methyl cyclohexane being preferred. It is not so advantageous to use hydrocarbons containing less than 5 carbon atoms, since the process then has to be carried out at very low temperatures or under superatmospheric pressure.

The process is carried out, for example, by thoroughly mixing the polymeric starting materials with the solvent mixture, the solvent mixture being used in an amount which is from 2 to 6 times that of the polymeric starting material.

In an advantageous procedure, the solvent mixture initially used contains the components a, b and c in a weight ratio of about 1:1:1. Since the chosen ratio of components in the solvent mixture affects both the degree of narrowing of the molecular weight distribution and the weight-related distribution of the two molecular weight fractions in the two lower phases, and the hydrocarbon and alcohol used also affect the separation of the polymer used, it is advisable to determine the solvent mixture which is most advantageous for the individual polymer by means of a few experiments, for example by doubling or halving the amount of alcohol or water in the solvent mixture until the desired distribution is obtained. Varying the amount of hydrocarbon generally has relatively little effect. The amount of this should be chosen to be about 10-100% by weight, based on the starting polymer to be treated.

The chosen temperature for mixing is from 0° to 80° C., preferably from 15° to 40° C. It is advisable to carry out the process at temperatures at which the solvent mixture used as a comparatively low vapor pressure. Thermal effects on the distribution can in most cases be compensated by appropriate choice of the ratio of the three components of the solvent mixture. The necessary good mixing of the phases can be achieved using any conventional technique, such as stirring or shaking or by using a propulsive jet. The three phases are separated, for example, simply by discharging them and observing the phase boundaries, or by means of centrifuges. The three phases obtained are freed from the adhering solvents by a conventional method, for example by distillation under atmospheric pressure or reduced pressure. The polymers having the narrower molecular weight distribution are obtained from the two lower phases. Where PTHF or copolymers of THF and alkylene oxide are used, oligomeric cyclic ethers are isolated from the uppermost phase, the higher molecular weight fraction of the PTFH from the middle phase, and the lower molecular weight fraction of the PTHF from the lower phase. The solvents evaporated off can be condensed and then reused for the process.

In the novel process, it is possible to separate polymers having a broad molecular weight distribution and of average molecular size into two fractions which both have a very narrow distribution and in which the ratio of the mean molecular sizes is 1:2. The uppermost phase contains oligomeric cyclic ethers in addition to very small amounts of PTHF, ie. in each case less than 5% by weight of the PTHF used. The removal of the oligomeric cyclic ethers has a very desirable effect since these substances constitute neutral components with regard to the further use of the polymer The resulting narrowing of the molecular weight distribution and the separation of the original polymer into two fractions differing substantially in their molecular weights were unexpected and surprising. U.S. Pat. Nos. 4,500,705 and 4,251,654 describe the extractive treatment of copolymers of THF and ethylene oxide with hydrocarbons and water. According to the stated patents, the oligomeric cyclic ethers pass into the hydrocarbon phase or into the water phase. In view of this fact, it was not possible to foresee that, in the novel procedure using a combination of three solvents, the oligomeric cyclic ethers would pass to the uppermost phase, which essentially consists of a hydrocarbon. The possibility that the oligomeric cyclic ethers would likewise accumulate in the lowermost heavier phase had to be considered. The advantageous separation of the polymers into two useful molecular weight fractions without contamination by oligomeric cyclic ethers would not have been achievable in this case.

BRIEF DESCRIPTION OF THE DRAWINGS

As shown in FIG. 1, 2 separating columns (1) and (2) connected in series are charged with a feed mixture which has been homogenized in a mixer (3).

The starting materials pass via the feed lines (4), (5), (6) and (7) into the mixer (3).

The homogenized mixture is allowed to separate into three phases in the first column, the phase boundary layer of the lower phase with the two upper phases being arranged so that the lower phase occupies 90% of the total volume of separating column (1). In order to achieve this, the lower phase is removed continuously (8) from column (1) so that the boundary with the upper two phases does not change its level. The upper two phases flow away continuously via the top of the column (1) and are passed, via a feed located in the middle (9) of separating column (2), into column (2). There, the mixture is separated into an upper phase and a lower phase, the original middle phase.

There too, the level of the boundary between the two phases is maintained so that the lower phase occupies 90% of the total volume of separating column (2). In this case, too, the middle phase, which appears as the lower phase in column (2), is removed continuously (10) with level control, while the upper phase overflows freely (11).

The three phases obtained are then worked up separately.

In the Examples, parts are by weight, and parts by weight bear the same relation to parts by volume as that of the kilogram to the liter.

EXAMPLE 1

A two-phase solvent mixture consisting of one part of cyclohexane, one part of methanol and one part of water is mixed thoroughly with one part of PTHF for 5 minutes. The PTHF used has a mean molecular weight of 630, determined from the hydroxyl number, and a heterogeneity factor $M_w/M_n$ of 2. Three clear phases separate from the mixture in a short time (less than 10 minutes). The weight ratio of the upper, middle and lower phase is about 1:1.8:3.6. The phases are separated into solvent and PTHF by separating the phases from one another and then evaporating them down separately under atmospheric pressure and reduced pressure at up to 140° C. The upper phase gives 99.9% pure cyclohexane and, as the residue from evaporation, 1.5% by weight of the PTHF used. The residue is liquid and essentially consists of oligomeric cyclic ethers. A heterogeneous solvent mixture containing cyclohexane, water and methanol in a weight ratio of 11:2:1 is obtained from the middle phase. 40% by weight of the PTHF used are obtained as the residue. This PTHF has a molecular weight of 1145, the heterogeneity factor $M_w/M_n$ is 1.4 and the viscosity at 40° C. is 2.8 poise.

The lower phase is also worked up in the manner described. The solvent mixture obtained consists of about 49% of methanol and 51% of water. 58.5% of the PTHF used are obtained as the residue from evaporation. The molecular weight is 360 and the heterogeneity factor is 1.4.

Essentially the same result is obtained if the solvent mixture used for the molecular weight fractionation is composed of one part of methyl cyclohexane, one part of methanol and one part of water.

When a solvent mixture composed of one part of cyclohexane, one part of ethanol and one part of water is used, 3% by weight of the PTHF used are found in the upper phase, 43% by weight in the middle phase and 54% by weight in the lower phase. The molecular weight of the PTHF in the middle phase is 1105. It has a heterogeneity factor $M_w/M_n$ of 1.5

EXAMPLES 2 TO 7

A PTHF prepared by cationic polymerization over a montmorillonite catalyst in the presence of acetic anhydride and subsequent hydrolysis is subjected, at an extraction temperature of 25° C., to molecular size fractionation with various solvent mixtures consisting of cyclohexane, methanol and water. The PTHF used has a molecular weight of 750, determined from the terminal groups, and a heterogeneity factor of 1.9. The results obtained are shown in the Table below, as a function of the composition of the solvent mixture.

TABLE

| | Solvent mixture | | | | PTHE content and molecular weight (MM) in the phases | | | | | | |
|---|---|---|---|---|---|---|---|---|---|---|---|
| | | Cyclo- | | | Upper phase | | Middle phase | | Lower phase | | $M_w/M_n$ |
| | PTHE | hexane | CH$_3$OH | H$_2$O | | | | | | | of the |
| Ex- | % by | % by | % by | % by | % by | | % by | | % by | | middle |
| ample | weight | weight | weight | weight | weight | MM | weight | MM | weight | MM | phase |
| 2 | 20 | 20 | 40 | 20 | 3 | — | 30 | 1608 | 67 | 500 | 1.4 |
| 3 | 20 | 40 | 20 | 20 | 3.5 | — | 50.5 | 1260 | 46.5 | 310 | 1.5 |

TABLE-continued

| | Solvent mixture | | | | PTHE content and molecular weight (MM) in the phases | | | | | | $M_w/M_n$ of the middle phase |
|---|---|---|---|---|---|---|---|---|---|---|---|
| | PTHE | Cyclo-hexane | CH$_3$OH | H$_2$O | Upper phase | | Middle phase | | Lower phase | | |
| Example | % by weight | % by weight | % by weight | % by weight | % by weight | MM | % by weight | MM | % by weight | MM | |
| 4 | 25 | 25 | 25 | 25 | 2 | — | 52 | 1220 | 46 | 320 | 1.5 |
| 5 | 27 | 27 | 20 | 20 | 2 | — | 68 | 1050 | 30 | 330 | 1.4 |
| 6 | 28 | 28 | 17 | 17 | 2 | — | 71 | 1007 | 27 | 290 | 1.6 |
| 7 | 31 | 31 | 31 | 7 | 1.5 | — | 21.5 | 1400 | 77 | 680 | 1.8 |

EXAMPLE 8

A two-phase solvent mixture consisting of 2.7 parts of cyclohexane, 1 part of methanol and 1.3 parts of water is mixed with 1.3 parts of a THF/ethylene oxide copolymer (26% by weight of ethylene oxide) at 25° C. The copolymer has a molecular weight of 1368, calculated from the hydroxyl number of 82 mg of KOH/g. The heterogeneity factor $M_w/M_n$ is 1.9. After the components have been mixed, three phases form, the weight ratio of the upper phase to the middle phase to the lower phase being 1:7:6. The phases are worked up as described in Example 1. The upper phase contains 0.1% of water, 1% of methanol, 92% of cyclohexane and 7% of copolymer. The hydroxyl number of 13 mg of KOH/g shows that this is an oligomeric cyclic ether copolymer. The middle phase consists of 4% of water, 5% of methanol, 40% of cyclohexane and 51% of a copolymer having a molecular weight of 1900 and a heterogeneity factor of 1.6. The lower phase is composed of 27% of water, 23% of methanol, 0.5% of cyclohexane and 49.5% of a copolymer having a molecular weight of 800 and a heterogeneity factor $M_w/M_n$ of 1.3.

EXAMPLE 9

A mixture of 18.18% by weight of polytetrahydrofuran having a molecular weight of 2000 and a heterogeneity factor $M_w/M_n$ of 2.3, 18.18% by weight of n-heptane, 18.18% by weight of water and 45.45% by weight of methanol, is mixed thoroughly. After this mixing procedure, three phases separate out when the mixture is at rest. These phases are separated from one another, and the adhering solvents, water, methanol and heptane are separated off, first under atmospheric pressure and then under reduced pressure. The polymer subjected to extractive partitioning in the solvent mixture is present in the upper phase in an amount of 0.80% by weight, in the middle phase in an amount of 26.84% by weight and in the lower phase in an amount of 72.36% by weight. The polymer in the middle phase has a molecular weight of 976 and a heterogeneity factor $M_w/M_n$ of 1.6. The polymer of the lower phase has a molecular weight of 2,992 and a heterogeneity factor $M_w/M_n$ of 1.8.

EXAMPLE 10 (continuous procedure)

As shown in the drawing, 2 separating columns (1) and (2) connected in series are charged with a feed mixture which has been homogenized in a mixer (3) and consists of one part of water, 1.8 parts of methanol, 0.7 part of n-heptane and one part of polytetrahydrofuran having a molecular weight of 2000 and a heterogeneity factor $M_w/M_n$ of 2.5. The starting materials pass via the feed lines (4), (5), (6) and (7) into the mixer (3). The mixture is passed continuously into the first separating column (1), which is operated at 40° C. Column (1) has a volume of 1.6 parts and a diameter/length ratio of 1:40. The second separating column (2) is identical to the first column (1) in shape and size. It is operated at 25° C. The homogenized mixture introduced is allowed to separate into three phases in the first column, the phase boundary layer of the lower phase with the two upper phases being arranged so that the lower phase occupies 90% of the total volume of separating column (1). In order to achieve this, the lower phase is removed continuously (8) from column (1) so that the boundary with the upper two phases does not change its level. The upper two phases flow away continuously via the top of the column (1) and are passed, via a feed located in the middle (9) of separating column (2), into column (2). There, the mixture is separated into an upper phase and a lower phase, the original middle phase. There too, the level of the boundary between the two phases is maintained so that the lower phase occupies 90% of the total volume of separating column (2). In this case too, the middle phase, which appears as the lower phase in column (2), is removed continuously (10) with level control, while the upper phase overflows freely (11).

The 3 phases obtained are worked up separately. By evaporation under atmospheric and reduced pressure it is found that the upper phase contains about 1% of the polytetrahydrofuran fed in. It also contains more than 99% of n-heptane. The middle phase contains about 85% of the polytetrahydrofuran and the solvent used, ie. heptane (55%), methanol (35%) and water (10%). The polytetrahydrofuran isolated from the middle phase has a molecular weight of 2761 g/mol and a heterogeneity factor $M_w/M_n$ of 2.2. The lower phase contains about 14% of the polytetrahydrofuran used. It consists of 35% of water and 65% of methanol. The polytetrahydrofuran in this lower phase has a mean molecular weight of 700 g/mol and a heterogeneity factor $M_w/M_n$ of 1.5.

I claim:

1. A process for narrowing the molecular weight distribution of a polymer selected from the group consisting of polytetrahydrofuran and copolymers of tetrahydrofuran and alkylene oxides, which process comprises:

mixing the polymer with a solvent mixture consisting of (a) an alkanol of 1 to 2 carbon atoms (b) a hydrocarbon of 4 to 12 carbon atoms and (c) water, the content of the individual components a, b and c in the mixture being from 8 to 60% by weight, with the ratio of solvent to polymer being sufficient to cause the mixture to separate into three phases upon standing;

allowing the mixture to form three phases;

separating said three phases from one another; and then isolating a polymer having a narrower molecular weight distribution from each of the two lower phases.

2. A process as claimed in claim 1 wherein the content of the individual components a, b and c in the solvent mixture is from 12 to 50% by weight.

3. A process as claimed in claim 2 wherein the content of the individual components a, b and c in the solvent mixture is from 15 to 40% by weight.

4. A process as claimed in claim 1, wherein the amount of hydrocarbon is about 10 to 100% by weight with reference to the starting polymer to be treated.

5. A process as claimed in claim 1, wherein mixing is carried out at from 15° to 40° C.

6. A process as claimed in claim 1, wherein the solvent mixture contains methanol as the alkanol.

7. A process as claimed in claim 1, wherein the solvent mixture contains a cycloaliphatic hydrocarbon of 5 to 8 carbon atoms as the hydrocarbon solvent.

8. A process as claimed in claim 7, wherein the solvent mixture contains cyclohexane or methylcyclohexane.

9. A process as claimed in claim 1, wherein mixing is carried out at from 0° to 80° C.

10. A process as claimed in claim 1, wherein the weight of solvent mixture used is from 2 to 6 times that of the polymer to be treated.

* * * * *